United States Patent [19]

Peter

[11] Patent Number: 5,375,674
[45] Date of Patent: Dec. 27, 1994

[54] OPERATOR CONTROL FOR LAWN AND GARDEN VEHICLES

[75] Inventor: Tim Peter, Medina, Ohio

[73] Assignee: MTD Products Inc., Cleveland, Ohio

[21] Appl. No.: 47,101

[22] Filed: Apr. 13, 1993

[51] Int. Cl.⁵ .................... A01D 69/08; A01D 69/10; B62D 51/04

[52] U.S. Cl. .................... 180/19.3; 180/315; 180/336; 180/6.62; 56/11.1; 56/11.2; 56/11.3; 56/11.8

[58] Field of Search ............ 180/315, 336, 333, 19.3, 180/19.1, 6.2, 6.24, 6.62; 56/11.1, 11.2, 11.3, 11.7, 11.8; 74/536, 545, 557

[56] References Cited

U.S. PATENT DOCUMENTS

| | | | |
|---|---|---|---|
| 4,209,964 | 7/1980 | Fuelling, Jr. et al. | 56/11.2 |
| 4,433,530 | 2/1984 | Schaefer | 56/11.8 |
| 4,558,558 | 12/1985 | Horner, Jr. et al. | 180/19.3 |
| 4,920,734 | 2/1990 | Wenzel | 56/11.1 |
| 4,967,543 | 11/1990 | Scag et al. | 56/11.1 |
| 4,991,382 | 2/1991 | Scag | 56/11.2 |
| 5,077,959 | 1/1992 | Wenzel | 180/19.1 |
| 5,127,215 | 7/1992 | Wenzel | 56/11.1 |
| 5,138,824 | 8/1992 | Oshima et al. | 56/11.3 |
| 5,146,735 | 9/1992 | McDonner | 56/11.3 |
| 5,155,985 | 10/1992 | Oshima et al. | 56/11.3 |

Primary Examiner—Brian L. Johnson
Assistant Examiner—Peter C. English
Attorney, Agent, or Firm—Lightbody & Lucas

[57] ABSTRACT

A control for a lawn and garden vehicle, such control utilizing a "U" shaped main direction control pivotally mounted to the handlebars. The control being physically interconnected to a transmission such that movement of the direction control forward causes the vehicle to move forward, and movement of the direction control backward causes the vehicle to move in reverse with the control being spring biased into a central neutral position.

20 Claims, 6 Drawing Sheets

OPERATOR CONTROL FOR LAWN AND GARDEN VEHICLES

FIELD OF THE INVENTION

This invention relates to an operator control for lawn and garden vehicles and, more particularly, to multiple speed walk behind lawn mowers for professional use.

BACKGROUND OF THE INVENTION

Lawn and garden vehicles typically have wheels on opposing sides of the vehicle which are selectively interconnected through a variable speed transmission and clutching mechanism to an engine. The wheels themselves are normally also braked. Typically the controls for this transmission and brake are mounted on the handlebars, typically with individual lever controls for the right and left sides in walk behind mowers. Examples of this may be found in U.S. Pat. Nos. 4,920,734, 4,991,382, 4,967,543, 5,127,215, and 5,146,735. In these units, some sort of levers which are mounted on either side of the handles of the lawn mower are utilized to control the wheel drive systems. In all cases, the operator maintains a separate solid interconnection directly to the handlebars as well.

OBJECTS AND SUMMARY OF THE INVENTION

It is an object of the present invention to provide for an instinctive main directional control for use with lawn and garden vehicles including walk behind lawn mowers.

It is another object of the present invention to provide for an easy to use main direction control for lawn and garden vehicles.

It is yet another object of the present invention to facilitate the control for speed and direction of lawn and garden vehicles.

It is still another object of the present invention to provide for a reliable forward direction cruise control for lawn and garden vehicles.

It is a further object of this invention to simplify the operator controls for lawn and garden vehicles.

Other objects and a more complete understanding of the invention may be had by referring to the drawings.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE INVENTION

The control of this invention is designed for use with handlebars 10. The actual control includes a main control 20, a brake control 40, and a cruise control 60. The handlebars 10 serve to mount the controls on the vehicle with which they will be utilized (vehicle not shown) as well as serving as a pivoting point for the main directional control. The handlebars 10 disclosed are a single generally "U" shaped tube 11 having flattened ends 12, 13. The tube 11 has a diameter of approximately 1.25", a width between the ends 12, 13 of approximately 22", and a backward extension of approximately $19+\frac{1}{2}''-20''$. The particular handlebars 10 disclosed are for utilization with a walk behind lawn mower. The lawn mower itself has a single hydrostatic transmission selectively interconnected through right and left clutch brake packs to laterally disposed drive wheels. The vehicle to which the handlebars 10 are connected include vehicle direction and speed controls, right and left clutches, right and left brakes, and an operator presence control. The vehicle also includes engine speed and blade clutch controls. The particular device disclosed, the vehicle direction and speed controls are combined in the single rotary control of the SUNDSTRAND 10 BDU hydrostatic power unit used with the transmission. These direction and speed functions could be provided through alternate transmissions if desired. The presence control is a switch that grounds the ignition of the engine so as to stop the vehicle's operation should operator presence not be sensed when either or both of the blade clutch or transmission clutch are activated. Alternative forms of presence controls could also be utilized. Although not related to the invention in this specific embodiment disclosed, the engine speed and blade clutch controls are normally mounted on the handlebars 10 in addition for easy access. For clarity they have been omitted in the preferred embodiment disclosed.

Figure 1:
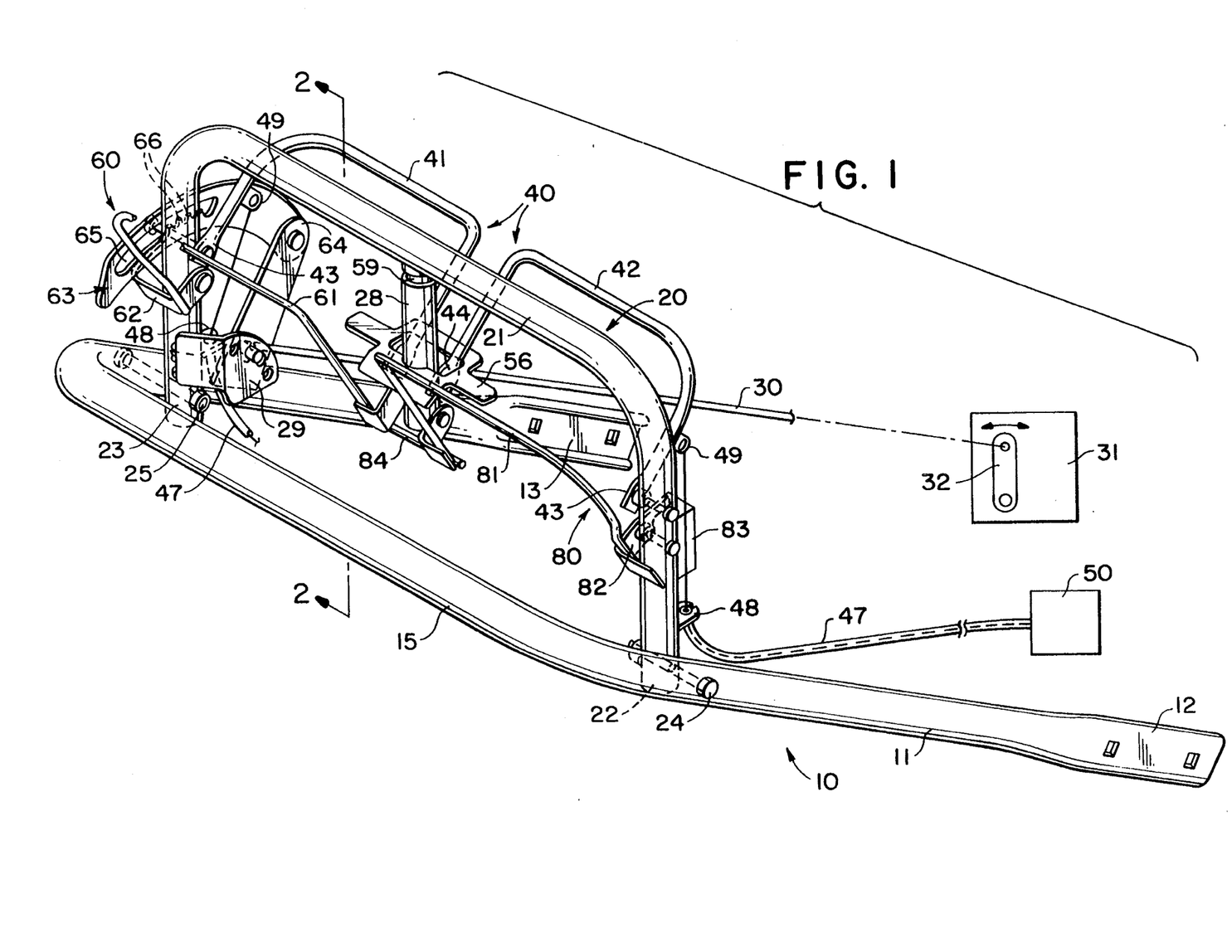
FIG. 1 is a side perspective view of a control incorporating the invention of the application, such control being in a neutral position.
Figure 2:
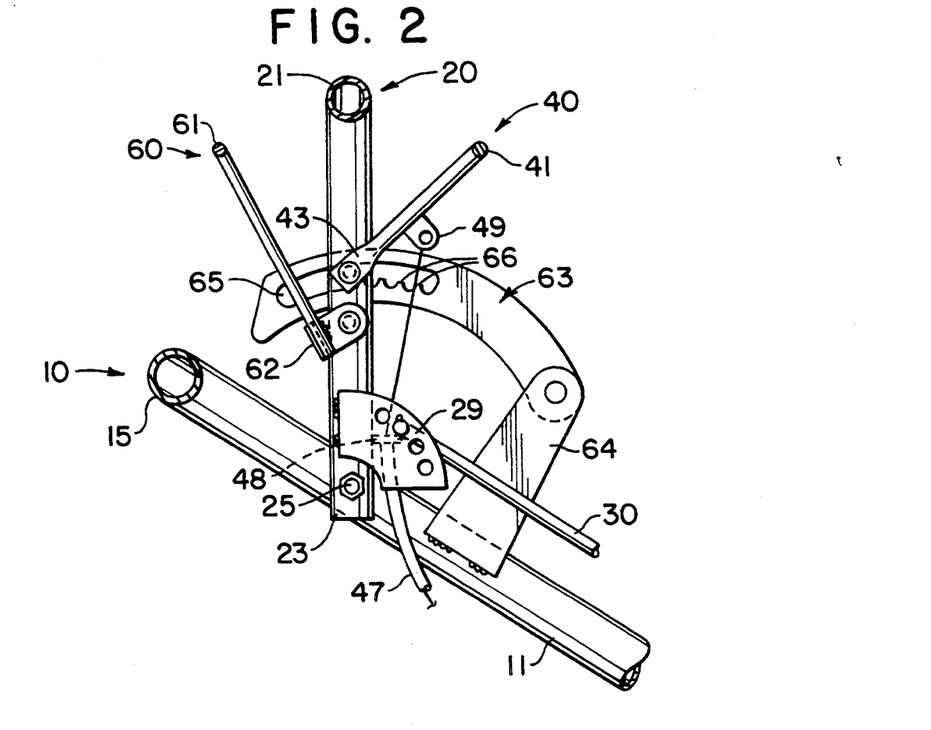
FIG. 2 is a side sectional view of the control taken along line 2—2 of FIG. 1.
Figure 3:
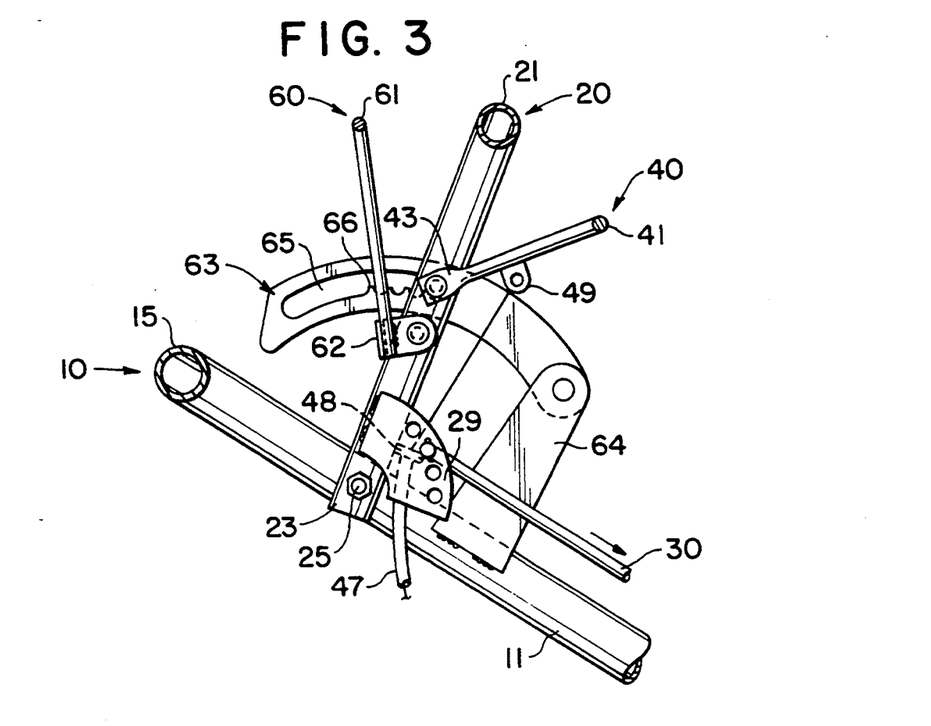
FIG. 3 is a side sectional view of the control of FIG. 1 in a forward operating condition, cruise control, and brake off.
Figure 4:
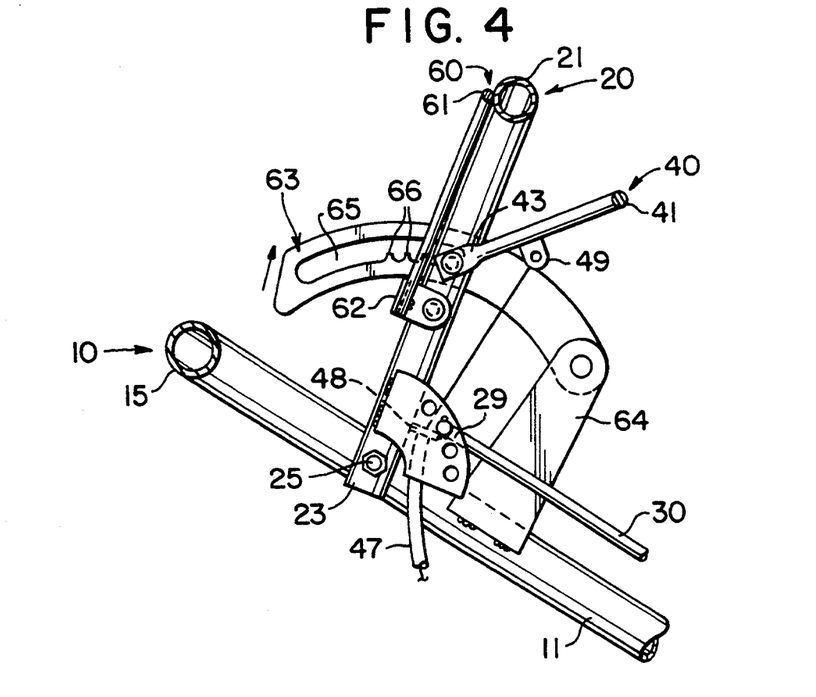
FIG. 4 is a side sectional view like FIG. 3 showing the cruise control in engaged condition.
Figure 7:
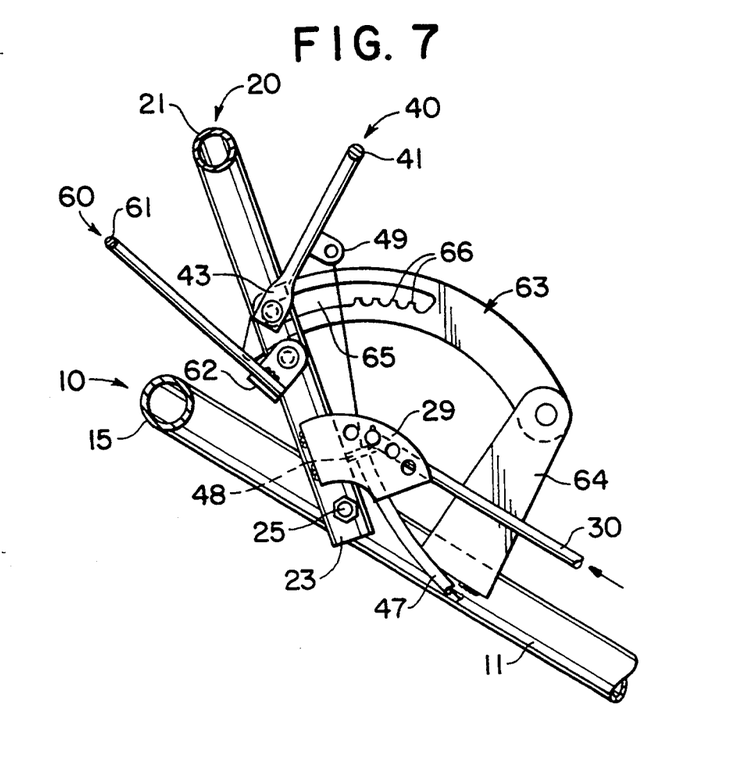
FIG. 7 is a side sectional view like FIG. 2 of the control in a reversed, non-braked, non-cruise control activated position.

The main control 20 is the direction and speed control for the vehicle. The main control 20 disclosed includes a generally "U" shaped tubular main direction control 21 having two ends 22, 23. Each end 22, 23 of the main directional control is pivotally mounted to the handlebars by two bolts 24, 25, respectively, for pivoting motion forward and reverse in an arc from a neutral position in respect thereto. A flange 29 is fixedly connected to one end of the main direction control extending fixedly there off for interconnection of the transmission direction speed control rod 30 to the main directional control 21. The transmission direction speed control rod 30 of this particular embodiment is interconnected to the single rotary hydrostatic transmission control 32 of the SUNDSTRAND 10 BDU hydrostatic unit (shown in representational form as 31 in FIG. 1). With this type of control, the direction of rotation about the control 32 controls the direction of travel of the vehicle with the amount of angular deviation being translated into varying speed in the direction of rotation. The transmission direction speed control rod 30 interconnects to the flange 29. Due to the internal spring bias of the rotary control 32 of the SUNDSTRAND unit, this interconnection also biases the main direction control 21 into a central neutral position. This is the default condition of the main directional control 21, which default condition is shown in FIG. 2. With his interconnection, rotation of the main directional control 21 in a forward direction (contrast FIG. 3 with FIG. 2) causes the vehicle to move forward, with a speed at which the vehicle moves forward dependent upon the degree of angular rotation. Upon the operator's releasing the control, the spring bias return the main direction control 21 to its central neutral position. Upon pulling the main direction control 21 backwards (contrast FIG. 7 with FIG. 2), the vehicle to which the control is interconnected will move in a reverse direction, again with the speed dependent upon the amount of angular rotation of the main direction control 21. (Normally the speed or the vehicle in a reverse direction is less than the speed in a forward direction.) Upon release of the main direction control 21, it again will be spring biased into its central neutral non-engaged position shown in FIG. 2. The main direction control 21 therefore is the main operator control for the vehicle, with the rearwardly located fixed central section 15 of the handlebars serving to interconnect the two sides of the handlebars 10 and to provide for an ability to manually manipulate the vehicle should such be necessary (such as loading or unloading without engine power, etc.).

Other types of devices could be utilized to control the direction and control the speed of the vehicle to which the handlebars 10 are interconnected with the interconnections to the main direction control 21 varying. For example, the transmission could be a single speed mechanical forward/neutral/reverse shifting transmission with the speed under the control of the throttle. For this type or device, there would be a hi-directional throttle control interconnection to the main direction control 21 such that the speed of the engine would be adjusted based on the degree of angular rotation of the main direction control 21 with the forward/neutral/reverse shifting of the mechanical transmission under the control of the direction of the pivoting motion. Other adaptations could be made to utilize multiple speed mechanical transmissions, variator type transmissions, planetary transmissions, or other types of direction and speed control mechanisms, The particular main direction control 21 has a central downwardly extending tube 28 extending centrally there off. This tube 28 is fixedly connected to the main direction control 21 so as to provide an intermediate pivoting point for the secondary controls later described.

The secondary controls include a brake control 40, a cruise control 60, and a presence control 80.

The brake control 40 is for selectively engaging and-/or disengaging the brakes for the vehicle. In the particular embodiment disclosed, this engagement is a two step process with partial actuation of the brake control placing a wheel drive into neutral with further movement actuating a brake for such wheel. The right and left wheels each has its own individual operation.

Figure 5:
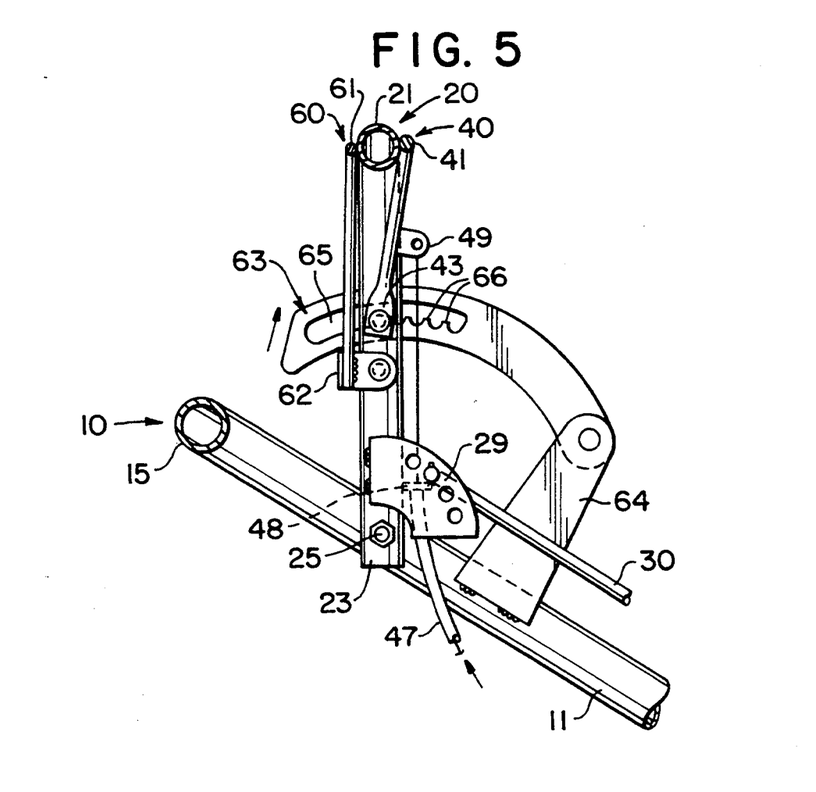
FIG. 5 is a side sectional view like FIG. 2 showing the control in a neutral braked condition with the cruise control activated.
Figure 6:
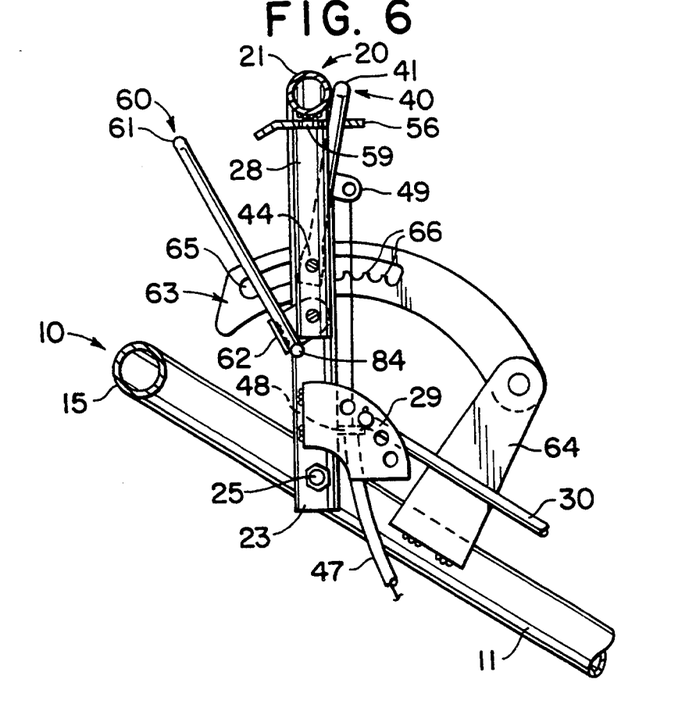
FIG. 6 is a sectional view like FIG. 5 with the cruise control in a non-activated position showing the brakes locked.
Figure 8:
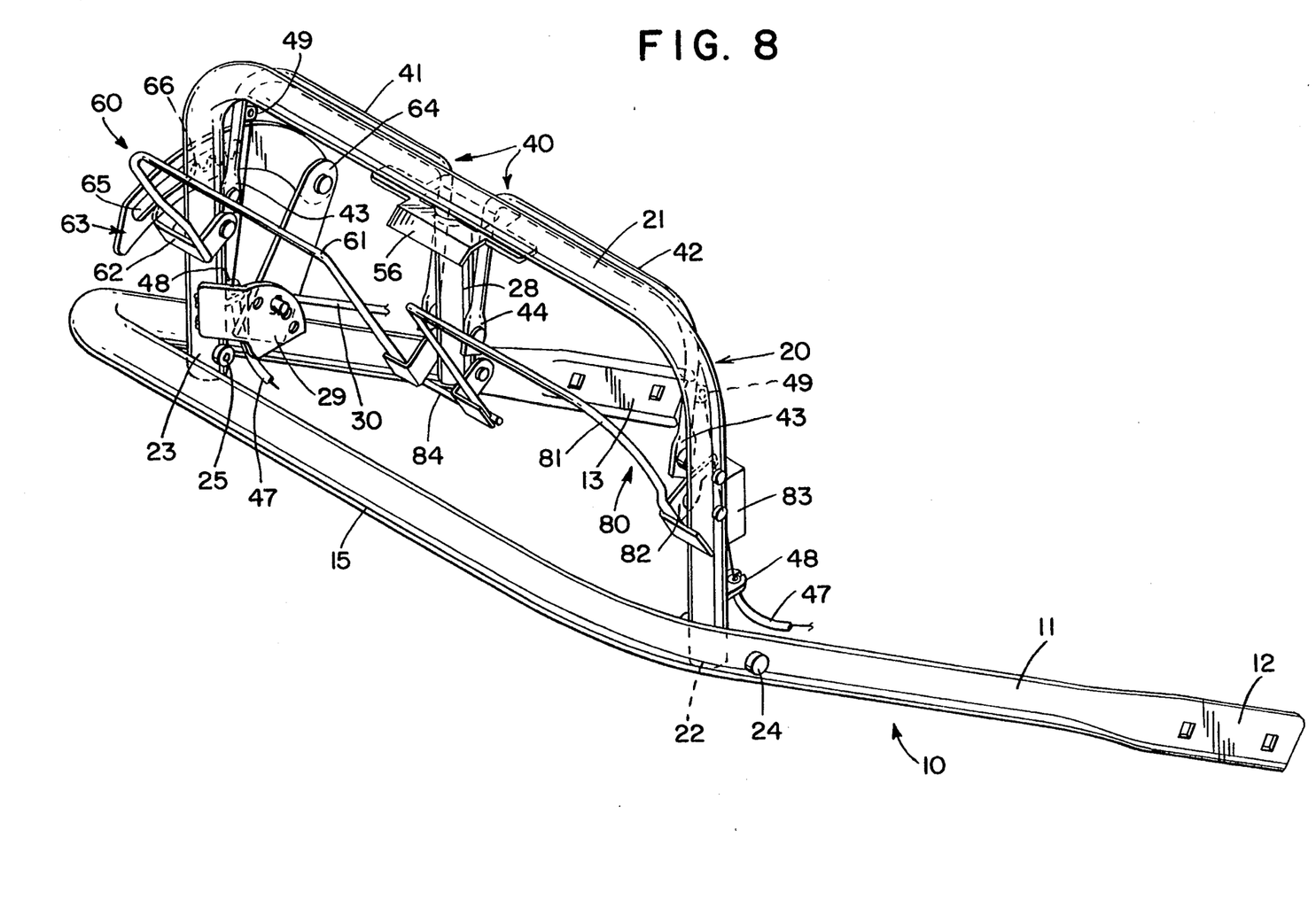
FIG. 8 is a perspective view like FIG. 1 showing the control in a neutral condition with locked brakes; and, FIG. 9 is an enlarged side sectional view of FIG. 2 with the cruise control and brake control in activated and non-activated conditions.

The particular brake control 40 disclosed includes two brake bails 41, 42 pivotally connected at their outer ends 43 to the tubing of the main directional control 21 and at their inner ends 44 to the bottom of the tube 28 that extends off of the main direction control 21. This allows the brake bails 41, 42 to each be individually pivoted from non-actuated positions (FIGS. 1, 2, 3, 4, and 7) to actuated positions (FIGS. 5, 6, and 8). Two control cables 47 with their outer casings terminated to two stops 48 on the main direction control 21 and their inner wires terminated at fasteners 49 on the brake bails interconnect the brake bails to the previously described clutch neutral brake mechanism 50 for each lateral side of the vehicle. Springs within each brake unit 50 serve to bias the brake bails 41, 42 into their non-brake activated clutch engaged position. This serves to hold the brake bails into a default condition of an uninterrupted drive between the transmission and the wheels on the lateral sides of the vehicle respectively.

Upon manipulation of the brake bails 41, 42, the brake unit 50 first declutches the wheel drive to a particular wheel on the respective side of the vehicle with further angular movement of the brake bails 41, 42 serving to actuate the brakes for the particular side, thus stopping the rotation of that particular wheel. The initial declutching of the brake mechanism 50 provides for a gradual turn in the direction of the non-clutched non-driven wheel with further movement braking such wheel to cause a tighter turn. Actuation of both brake bails simultaneously first serves to slow the vehicle (neutral clutch) and then serves to brake it (both brake mechanisms actuated). This provides for a slowing of the vehicle. Because the brake controls interrupt the power from the transmission to the wheels, these brake controls can be actuated in any position of the main direction control 21. These brake controls thus provide for both steering and braking controls for the vehicle.

The upward manipulation of a brake plate 56 slidingly mounted about the tube 28 serves to interlock the brake bails 41, 42 into their braked positions. This provides for a parking brake for the vehicle. The brake plate 56 is designed to cooperate with a small groove 59 in the top portion of the tube 28 such that the brake plate 56 is retained into an interlocked position as long as there is tension on the brake bails 41, 42, with the release of the tension on both brake bails 41, 42 serving to disengage the plate 56 from the groove 59 to drop the brake plate 56 to the bottom of the tube, thus releasing the parking brake.

Although the particular braking mechanism 50 disclosed has a separate braking system for each individual side of the vehicle, each system having drive, neutral, declutched, and engaged braking conditions for each wheel, other braking systems could be substituted as for a particular application. Examples of this would include an individual non-declutching brake for each respective side in a vehicle having a differential or a common brake for both sides. In the latter case, manual manipulation of the handlebars 10 would serve to steer the vehicle.

The cruise control 60 serves to retain the main direction control 21 in a set angular orientation in respect to the handlebars 10. This allows the vehicle to maintain a constant velocity and transmission state without constant adjustments and the attendant uneven operation (for example an uneven cut for a lawn). In the particular embodiment disclosed, the interlock is operative only in a forward direction.

Figure 9:
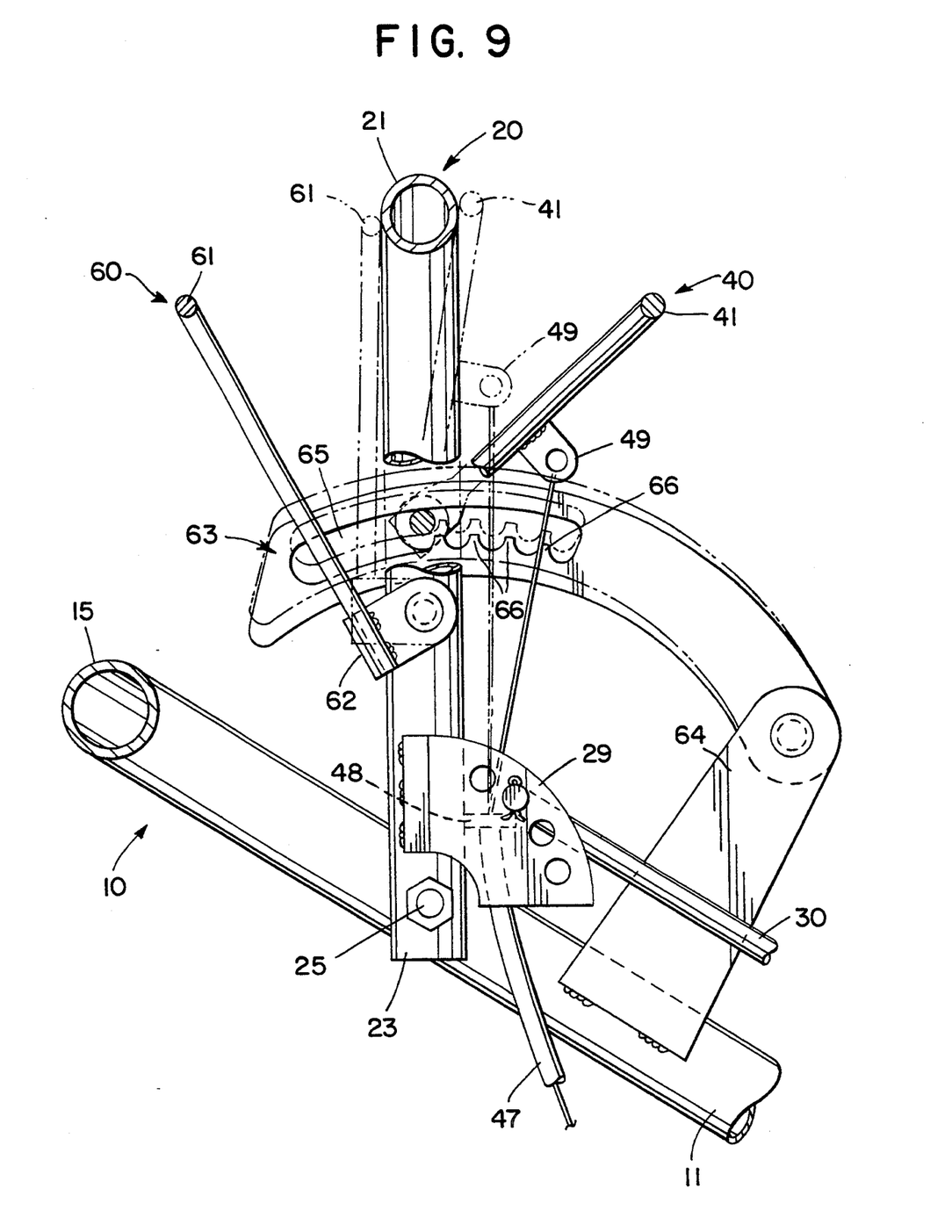

The cruise control 60 itself includes a cruise bail 61, a cruise interlock 62, and a position lock 63. The position lock 63 is a generally arcuate member which has a pivoting connection to a flange 64 extending off of the tube 11 of the handlebars and a longitudinally extending groove 65 having teeth 66 along the forward extent thereof. The cruise bail 61 is pivotally connected to the main direction control 21 at one end and the tube 28 at the other end for arcuate pivoting action in respect thereto from a rearward non-activated condition to a forward activated condition. A cruise interlock 62 is fixedly connected to the outward end of the cruise bail 61 located directly beneath the arcuate position lock 63. With this orientation, upon forward movement of the cruise bail 61 to an actuated condition, the position lock 63 is moved in an upward direction by the interlock 62 such that the teeth 66 on the position lock 63 are engaged with the pivot bolt for the left brake bail 41. This action locks the main direction control 21 into the position represented by the teeth. This action can be seen in FIG. 9 of this application. Once the cruise bail 61 is in an actuated condition, the main direction control 21 will remain at a constant angular position in respect to the handlebars 10 until the cruise bail 61 is released. When the bail 61 is released, the main direction control 21 is again free to be pivoted. Due to the lack of the teeth in the groove 65 rearward of the neutral position of the main direction control 21 in the preferred embodiment, it is impossible for any action of the cruise bail 61 to lock the vehicle into a fixed rearward operation condition. Further, the location of the wall of the first tooth in the preferred embodiment corresponds to transmission very slow forward. With this orientation, pushing the main direction control 21 forward with the cruise control activated located the transmission in a slow forward position without over travel to fast forward. This facilitates slow speed maneuvering in tight places.

The presence control 80 serves to indicate to the vehicle that an operator is in control of the vehicle. The particular presence control shown includes an operator presence bail 81 pivoted at one end to the main direction control 21 and at the other end to the downwardly extending tube 28. A small flange 82 extending forward off of a lower end of the operator presence bail 81 serves to actuate a presence switch 83 when the operator presence bail 81 is in its forward sensed position. Under these operator sensed conditions, the vehicle is in no way disabled via its operator presence control mechanism. In the particular embodiment disclosed, this operator presence control is connected to the ignition of the engine, grounding same if any clutch is in an actuated condition in absence of an operator. In the particular embodiment disclosed, a small connecting link 84 extending off of the bottom of the cruise bail 81 allows for movement of the cruise control bail from a non-actuated to an actuated condition to also move the operator presence bail from a non-sensed to a sensed position. This allows for one handed operation of the vehicle during times when the cruise control 60 is actuated. This also allows for the independent operation of the operator presence bail 81 without also simultaneous actuation of the cruise bail 61.

To operate the vehicle, the operator starts the engine of the vehicle. At this time, the operator will push the operator presence bail 81 forward and engage any mower blade clutch. The operator would then push the main direction control 21 forward in order to establish the desired forward direction and speed operating conditions. At this time, the cruise bail 61 can be pushed forward if desired in order to maintain the main direction control 21 in that preset angular position by engaging the teeth of the position lock 63 with the protruding bolt on the main direction control 21. Thereafter, to steer the vehicle for example, the operator uses their fingers to either engage the left brake bail or right brake bail as desired in order to steer and/or stop the vehicle. In the event that the operator desires to go backwards, the operator releases the cruise bail 61 while maintaining the operator presence bail 81 in its forward condition. The operator can then pull the main direction control backwards through a neutral position in order to establish a reverse operation condition for the vehicle. Due to the lack of the teeth on the groove 65 of the position lock 63, inadvertent actuation of the cruise bail 61 while the vehicle is travelling backwards will not lock the operator direction control 21 into any position, thus allowing for an unimpeded forward push of the main direction control 21 to place the vehicle in a neutral position. In this respect, it is noted that the teeth 66 in the groove 65 of the preferred embodiment are selected such that there is a positive stop at a slight forward positioning of the main direction control 21. This would allow an operator to use the cruise bail 61 in order to put the vehicle into a slow forward from reverse without problems of overshooting and putting the vehicle into fast forward. This facilitates slow speed maneuvering of the vehicle.

Although the invention is described in its preferred embodiment with a certain degree of particularity, it is to be understood that numerous changes can be made without departing from the claimed invention. For example, the pivoting main direction control 21 can be used with rototillers, garden tractors, and other vehicles having transmission controls and a relatively fixed mounting location for such control. Additional example, the main direction control and the bails are each pivoted on both ends. This is preferred due to longevity and strength. However, the control and bails could be pivoted on one end with suitable modification to primarily the pivot bearing and associated control. Other modifications are also possible.

What is claimed:

1. A control for a lawn and garden vehicle having a transmission with a forward, neutral, and reverse shift control, and having handlebars,
   the control comprising a main direction control, said main direction control having two ends, said two ends of said main direction control being respectively pivotally mounted to the handlebars for forward and reverse pivoting movement of said main direction control in respect thereto from an intermediate neutral position,
   means to bias said main direction control into the intermediate neutral position,
   a control rod connecting said main direction control to the forward, neutral, and reverse shift control such that pushing said main direction control forward from the intermediate neutral position shifts the transmission into forward and pulling said main direction control rearward from the intermediate neutral position shifts the transmission into reverse, and means for said main direction control to steer the vehicle right or left.

2. The control of claim 1 wherein the vehicle has a presence control characterized by the addition of an operator presence bail, said operator presence bail having two ends, said two ends of said operator presence bail being respectively pivotally mounted to said main direction control for pivoting movement of said operator presence bail in respect thereto from a sensed to a non-sensed position, and means to interconnect said operator presence bail to the presence control.

3. The control of claim 2 characterized in that said operator presence bail is positioned on the rearward direction side of said main direction control with said operator presence bail having a forward sensed position.

4. The control of claim 1 wherein the vehicle has a clutch and characterized by the addition of a bail,
said bail having two ends, said two ends of said bail being respectively pivotally mounted to said main direction control for pivoting movement of said bail in respect thereto from a non-engaged declutched position to a clutched position,
means to bias said bail in the non-engaged position, and a cable connecting said bail to the clutch.

5. The control of claim 4 characterized in that said bail is positioned on the forward direction side of said main direction control with said bail having a rearward declutched position.

6. A control for a lawn and garden vehicle having a transmission with a forward, neutral, and reverse shift control, having handlebars and a brake, the control comprising a main direction control,
said direction control having two ends, said two ends of said main direction control being respectively pivotally mounted to the handlebars for forward and reverse pivoting movement of said main direction control in respect thereto from an intermediate neutral position,
means to bias said main direction control into the intermediate neutral position,
a control rod connecting said main direction control to the forward, neutral, and reverse shift control such that pushing said main direction control forward from the intermediate neutral position shifts the transmission into forward and pulling said main direction control rearward from the intermediate neutral position shifts the transmission into reverse,
a brake bail, said brake bail having two ends, said two ends of said brake bail being respectively pivotally mounted to said main direction control for pivoting movement of said brake bail in respect thereto from a non-engaged position to a braking position,
means to bias said brake bail in the non-engaged position, and a cable connecting said brake bail to the brake.

7. The control of claim 6 characterized in that said brake bail is positioned on the forward direction side of said main direction control with said brake bail having a rearward braking position.

8. The control of claim 6 characterized by the addition of means for said brake bail to place a wheel drive into neutral during the pivoting movement of said brake bail from the non-engaged position to the braking position.

9. A control for a lawn and garden vehicle having a transmission with a forward, neutral, and reverse shift control, having handlebars and the control comprising a main direction control,
said main direction control having two ends, said two ends of said main direction control being respectively pivotally mounted to the handlebars for forward and reverse pivoting movement of said main direction control in respect thereto from an intermediate neutral position,
means to bias said main direction control into the intermediate neutral position,
a control rod connecting said main direction control to the forward, neutral, and reverse shift control such that pushing said main direction control forward from the intermediate neutral position shifts the transmission into forward and pulling said main direction control rearward from the intermediate neutral position shifts the transmission into reverse,
a cruise control bail,
said cruise control bail having two ends, said two ends of said cruise control bail being respectively pivotally mounted to said main direction control for pivoting movement of said cruise control bail in respect thereto from a non-activated to an activated condition, means to bias said cruise control bail to the non-activated condition,
a control position lock, said control position lock having two ends, means to interconnect one end of said position lock to one of the handlebars or said main direction control, and means to selectively connect or disconnect the other end of said position lock to the other of the handlebars or said main direction control by movement of said cruise control bail to the activated condition so as to selectively lock said main direction control from pivoting movement in respect to the handlebars.

10. The control of claim 9 characterized in that said cruise control bail is positioned on the rearward direction side of said main direction control with said cruise control bail having a forward activated condition.

11. The control of claim 9 characterized by the addition of an operator presence bail having non-sensed and sensed positions, and means to interconnect said cruise control bail to said operator presence bail such that movement of said cruise control bail from the non-activated to the activated condition moves said operator presence bail from the non-sensed position to the sensed position.

12. A control for a lawn and garden vehicle having a transmission with a forward, neutral, and reverse shift control, a variable speed control, and having handlebars,
the control comprising a main direction control, said main direction control having two ends, said two ends of said main direction control being respectively pivotally mounted to the handlebars for forward and reverse variable pivoting movement of said main direction control in respect thereto from an intermediate neutral position,
means to bias said main direction control into the intermediate neutral position,
a control rod connecting said main direction control to the forward, neutral, and reverse shift control such that pushing said main direction control forward from the intermediate neutral position shifts the transmission into forward and pulling said main direction control rearward from the intermediate neutral position shifts the transmission into reverse, and speed means for the variable pivoting of said main direction control to operate the variable speed control for the vehicle.

13. The control of claim 12 wherein the transmission is a variable speed transmission and characterized in that said speed means includes the variable speed transmission.

14. The control of claim 12 wherein the vehicle is powered by an engine having a variable speed throttle and characterized in that said speed means includes the variable speed throttle.

15. The control of claim 12 characterized by the addition of means for said main direction control to steer the vehicle left or right.

16. The control of claim 12 wherein the vehicle has a brake and characterized by the addition of a brake bail,
said brake bail having two ends, said two ends of said brake bail being respectively pivotally mounted to said main direction control for pivoting movement of said brake bail in respect thereto from a non-engaged position to a braking position, means to bias said brake bail in the non-engaged position, and a cable connecting said brake bail to the brake.

17. The control of claim 16 characterized in that said brake bail is positioned on the forward direction side of said main direction control with said brake bail having a rearward braking position.

18. The control of claim 16 characterized by the addition of means for said brake bail to place a wheel drive into neutral during the pivoting movement of said brake bail from the non-engaged position to the braking position.

19. The control of claim 12 wherein the vehicle has a presence control characterized by the addition of an operator presence ball, said operator presence bail having two ends, said two ends of said operator presence bail being respectively pivotally mounted to said main direction control for pivoting movement of said operator presence bail in respect thereto from a sensed to a non-sensed position, and means to interconnect said operator presence bail to the presence control.

20. The control of claim 19 characterized in that said operator presence bail is positioned on the rearward direction side of said main direction control with said operator presence bail having a forward sensed position.

* * * * *